Patented May 29, 1951

2,555,174

UNITED STATES PATENT OFFICE 2,555,174

VITREOUS BONDED DIAMOND ABRASIVE PRODUCT AND METHOD OF MAKING SAME

Harry Whittaker, Elizabeth, and Paul L. Kuzmick, Passaic, N. J., assignors to J. K. Smit & Sons, Inc., New York, N. Y., a corporation of New York No Drawing. Application June 15, 1948, Serial No. 33,236

21 Claims. (Cl. 51—308)

The present invention relates to a vitreous bonded diamond abrasive product and to a method for making the same.

The manufacture of diamond abrasive products, and in particular of diamond abrasive discs and wheels, has presented manifold difficulties particularly insofar as the choice of a suitable bonding material is concerned. Such a bonding material must not only possess sufficient strength so as to constitute a rigid matrix in which the diamond abrasive particles are held, but the material must also be of such a character as to adhere to the small diamond particles in order that those particles will be retained in the wheel for abrasive action until their usefulness is at an end. In addition it is requisite that the bonding material be so constituted that when the diamond particles on the surface of the abrasive article become worn, they will break away from the article, thus exposing new abrasive particles, so that the abrasive article may be used over a long period of time.

The major factor limiting the type of bonding material useable with diamond abrasive particles is the chemical nature of the diamond particles themselves, which tend to oxidize and lose their abrasive qualities if raised to too high a temperature over any appreciable period of time. Since most suitable bonding materials require a maturing treatment over a long period of time at temperatures such that substantial oxidation will take place, it has been found necessary, when such bonding materials are used, to carry out the cure in an inert or reducing atmosphere in order to minimize oxidation of the diamond particles. Not only does the cure itself materially increase cost of production of the abrasive articles because of its long duration, which necessarily leads to limited quantity production, but the requirement of a non-oxidizing atmosphere makes for great expense in the carrying out of the cure, since relatively complex equipment is required and expensive chemicals are consumed in the process.

In order to eliminate the use of a non-oxidizing atmosphere, various bond compositions have been proposed which mature at temperatures sufficiently low so that oxidation is not excessive when an ordinary atmosphere is employed. Some of these bonding compositions have resulted in commercially acceptable abrasive articles, but they are all characterized by the fact that relatively long maturing periods, on the order of several hours, are required. As has already been stated, this increases the cost of the finished article and reduces productivity. In addition, it has been found that if a diamond abrasive article is maintained at such temperatures for the long period of time necessary for cure of the bond, some oxidation or deterioration does take place, the extent of the deterioration of the abrasive particles depending upon the length of time to which they are subjected to elevated temperatures. Hence, even when bonding materials are employed which mature at relatively low temperatures, on the order of 1800° F., the necessity for using non-oxidizing atmospheres has not in the past been entirely eliminated because of the extended curing times involved.

The customary method of formation of a diamond abrasive article such as a diamond abrasive grinding wheel is to mix the bonding material with the abrasive particles, give it a preliminary shaping, remove it from the mold, and then subject it to high temperatures for extended periods of time. This is known as the "open fire" method. The temperature to which the abrasive article is subjected is critical. If the temperature is too high, the bonding material will become too fluid and the article will slump and lose its shape. If the temperature is too low, the bonding material will not liquify throughout the abrasive article and permeate the entire article so as to firmly bond all of the diamond particles. In addition, since the heat is necessarily applied from the exterior of the article, skin tends to form on the outside of the article, this skin preventing the escape of the reaction gases formed in the interior of the article and consequently often leading to swelling and bloating of the article. An abrasive disc or wheel formed according to this method is, when its curing has been completed, of very irregular external dimensions and considerable truing operations must be performed upon it before it is saleable or useable.

The prime object of the present invention is to devise a vitreous bonded diamond abrasive article which is subjected to elevated temperatures only for a very short period of time. As a result, the diamond abrasive particles will be substantially undeteriorated even without the employment of non-oxidizing atmospheres.

Another prime object of the present invention is to devise a vitreous bonded diamond abrasive article which may be formed and cured simultaneously.

Yet another object of the present invention is to devise such an article which requires no extended curing treatment whatsoever.

An additional object of the present invention is to devise such an article which, after it has been formed, and simultaneously cured, has substantially its finished shape.

A still further object of the present invention is to devise such an abrasive article which is bonded by a material which is freely pourable at temperatures below those requiring the use of inert atmospheres, the bonding material being present in such proportion that the abrasive article is easily formable upon the application of moderate pressure thereto.

Another object of the present invention is to devise a vitreous bonded diamond abrasive product the abrasive characteristics of which are superior to those made by conventional methods.

Another prime object of the present invention is to devise a method for fabricating such abrasive articles which will entirely eliminate the curing or maturing step which is now believed to be essential.

A still further object of the present invention is to devise a method for making a diamond abrasive product in which the diamond abrasive particles are exposed to lower heats and for a considerably decreased period of time than has heretofore been thought necessary.

A still further object of the present invention is to devise a method of making a vitreous bonded abrasive product, which method is rapid, accurate, may be carried out with conventional and relatively inexpensive equipment, and which is susceptible of many variations for the production of non-standard products.

To the accomplishment of the foregoing objects and such other objects as may hereinafter appear, the present invention relates to the composition of a vitreous bonded diamond abrasive product and to a method for making the same as defined in the appended claims and as set forth in this specification.

The bonding material which I employ is one which imparts to the finished article a glass-like bond which is capable of wetting the diamond particles and hence adequately securing them in the article itself. Many such glass-like bonds have been proposed in the past. Most of them require a temperature of treatment well above 1800° F. These bonding materials consequently require the employment of an inert or at least a non-oxidizing atmosphere in order that the diamond particles should not be destroyed. Other such bonding materials which have in the past been proposed soften at approximately 1800° F., but this temperature merely represents the point at which the bonding material will itself become formable. I employ a bonding material which softens at a temperature well below 1800° F. and which is freely pourable in a liquified state at between 1600° and 1800° F.

I mix this bonding material, preferably in a dry and granulated state, with the abrasive particles and I then place the resultant mixture in a standard closing type mold of a configuration suitable to the article to be formed. The mold and its contents are subjected to heat until the contents are brought to a temperature of 1800° F. or less, and preferably in the range of 1600° to 1800° F., at which temperature the bonding material is liquified and freely permeates throughout the body of the article so as to wet and bond the abrasive particles. At this time the composite mix is soft and freely formable upon the application thereto of very moderate pressures.

The mold and its contents, while maintained at this temperature and in this condition, are subjected to pressures on the order of 50 to 100 lbs. per square inch, this pressure being applied until the mold has fully closed. Pressure is then released and the mold is permitted to cool, after which the formed article is removed from the mold. The total time consumed in fabricating the article is on the order of one hour or less, and the article when removed from the mold is completely finished. No curing or maturing cycle is necessary and the article, since it has been formed in an accurately machined mold, requires no later time consuming shaping operation. All that is necessary is that the mounting hole be accurately shaped and that the periphery of the article be dressed to that hole. A maximum of only a few thousandths of an inch must be removed from the periphery of the article made according to my method whereas a much greater amount must be removed insofar as prior art methods are concerned. It is estimated that only one-tenth of the amount of dressing work need be performed on articles made according to my method in comparison with articles made according to prior art methods. The total fabrication time of one hour or less which is characteristic of my method compares most favorably with the 48 to 72 hours which is necessary with the best of standard prior art methods.

The bonding material is preferably mixed with the abrasive particles in the form of a frit. To this end, the materials which constitute the bonding material are melted in a crucible at 1800° F. until a clear glass results. This glass is then poured into water to quench it and the resultant glass particles are dried and ground in a ball mill to pass 250 mesh.

The fritted bonding material may be mixed with the diamond abrasive particles in a mortar in the presence of water. The resultant mixture is dried and the dried mixture is pulverized and is then spread evenly in the cavity of the closing type mold. Hardened steel or chrome nickel steel have been found to be exceedingly satisfactory materials for the mold. The amount of material which is placed in the mold is determined by the size of the mold and the desired density of the resultant article, and may be varied within wide limits.

The entire mold and its contents are then heated until the contents are freely shapeable. The amounts of abrasive particles and bonding material are so proportioned that this occurs when the mold has reached a temperature of approximately 1800° F. or less. This temperature may be reached as quickly as is feasible, and no long drawn out temperature control is required or even desirable. For small wheels, the mixture becomes soft enough for shaping and curing as soon as 1800° F. is reached, but larger pieces, for example, a 6 inch wheel, may require from 15 minutes to 1 hour before the entire mold contents have reached the proper degree of fluidity.

During this preliminary heating period no pressure is applied to the mold and consequently all gases evolved by reason of the heating of the bonding material may freely escape from the mold. Since the temperature is below that at which the diamond particles would rapidly oxidize, and since the period of time during which the particles are exposed to the temperature is very limited in duration, there is no need for the employment of artificial atmospheres of any type.

The mold may be heated in any desired manner. Excellent results have been obtained by placing the mold in a press and subjecting it to inductive heating therein. Equally good results have been obtained by placing the mold in a furnace until the desired temperature and condition of the mold contents have been reached and then removing the mold from the furnace and placing it in the press.

If desired, the abrasive articles may be preformed by including in the original mix a suitable quantity of temporary binder in the form of a substance which will volatilize at the temperatures to which the article is subjected. When such a temporary binder is employed, the mold and its contents are subjected to a preliminary press prior to heating, the temporary binder helping the molded article to retain its shape during the heating step and volatilizing and disappearing as the heating step is carried out. This preform operation, while it is entirely practical and gives good results, is by no means necessary for the practice of my invention.

When the mold contents have reached the desired condition of fluidity, which is attained at 1800° F. or less, pressure is then applied to the mold to close it. The pressure is applied only until the mold is closed, after which the pressure is released and the mold is removed from the press and permitted to cool, without the necessity of any precautions being taken. In about 3 to 5 minutes, the finished article may be removed from the mold, and it is then in final finished form. It has a coating of carbon on it which must be removed, this carbon being the mold lubricant, and the wheel must be dressed in conventional fashion but, as has already been pointed out, this step represents but a small proportion of the work involved in truing and forming wheels formed by more conventional processes.

It is noteworthy that the mold and its contents may be placed directly into a furnace at 1800° F. or less or may be heated as rapidly as possible to that temperature by any suitable means. In the more conventional "open fire" method the temperature to which the article is subjected must be raised by degrees over a long period of time, lest the wheel explode because of the generation of volatiles in its interior. It is also noteworthy that after forming in the press the article made according to the present invention is in finished form, whereas according to conventional methods, the article after forming is subjected to a long period of heat treatment or curing which causes warping and wearing of the article, which irregularities must be laboriously removed before the article is in finished condition.

The controlling characteristic of the bonding material is that it will pour freely in a liquified state at approximately 1600° to 1800° F. Since glass softens at a temperature several hundred degrees below that at which it will pour freely, it is apparent that the free pouring temperature is quite different from the softening temperature. The bonding material set forth below in Example 1 will soften at approximately 1200° F., some 500° to 600° below its pouring point.

The chemical composition of the bonding material may be varied within wide limits since it is a physical property of the bonding material, its pouring temperature, which is controlling. Various examples given below will illustrate the wide variety of bonding materials which are useable according to my invention and additional experiments will undoubtedly reveal other suitable bonding materials which act similarly to those specifically described. It is of course necessary that the bonding material be compatible with the abrasive particles employed and that it be capable of bonding them into the abrasive article. Broadly speaking, I have taken basic bonding materials of the type which have previously been employed in bonding diamond abrasive particles as well as other abrasive particles, which bonding materials alone were completely unsuited for use according to my invention, and have modified them by the incorporation therewith of melting temperature reducing fluxes of various types so that they exhibit the physical properties necessary to carry out my invention. This modification has, to my knowledge, never been carried out before. The use of fluxes with bonding materials such as a borosilicate glass has been known, but those fluxes have never been added in an amount sufficient to bring the pouring point of the bonding material within the range I have found effective.

*Example 1*

A bonding material particularly suitable for use according to the present invention may be made by combining the following substances, the figures after those substances indicating, in this and all other examples, proportions by weight:

Feldspar _____ 16
Borax glass _____ 46
Cryolite _____ 5
Barium carbonate _____ 11
Zinc oxide _____ 14
Sodium carbonate _____ 8

The silicate portion of the feldspar and the borax glass constitute the glass forming constituents of this bonding material. The cryolite, barium carbonate, zinc oxide and sodium carbonate are fluxes, as is the sodium or potassium constituent of the feldspar. The aluminum constituent of the feldspar serves as a hardening agent.

*Example 2*

A frit made according to Example 1 may be combined with abrasive particles and filler according to the following formula:

Diamond powder _____ 60
Silicon carbide grain _____ 47
Feldspar _____ 61
Kaolin _____ 49
Glass frit of Example 1 _____ 36

The silicon carbide and kaolin act as fillers, the glass frit constitutes the bonding material, and the feldspar acts partly as an auxiliary flux lowering the softening temperature of the mix and also, because of other constituents of the feldspar, tending to balance the fluidity of the frit and increase the viscosity of the mix in order to avoid bloating.

The following Examples 3 through 6 indicate alternative bonding material compositions which are also useable:

*Example 3*

Aluminum oxide _____ 18
Fused $B_2O_3$ _____ 4
Zinc oxide _____ 3
Potassium nitrate _____ 15
Sodium phosphate _____ 60

The fused $B_2O_3$ and the phosphate portion of the sodium phosphate unite to form a phosphate type glass. The zinc oxide, potassium nitrate, and the sodium portion of the sodium phosphate act as fluxes. The aluminum oxide is a hardening agent.

Example 4

| | |
|---|---|
| Silica | 13.5 |
| Feldspar | 35.0 |
| Borax glass | 15.5 |
| Barium carbonate | 30.0 |
| Calcium carbonate | 5.5 |

The borax glass, the silica and the silicate portion of the feldspar unite to form a glass. The remaining constituents act as fluxes.

Example 5

| | |
|---|---|
| Silica | 25.5 |
| Feldspar | 5.5 |
| Borax glass | 47.5 |
| Calcium carbonate | 11.5 |
| Magnesium carbonate | 10.0 |

The same comments apply here as in Example 4. The calcium and magnesium carbonates in this as well as other examples increase the chemical durability of the glass.

Example 6

| | |
|---|---|
| Feldspar | 16 |
| Cryolite | 5 |
| Barium carbonate | 11 |
| Zinc oxide | 14 |
| Sodium carbonate | 8 |
| Sodium titanium silicate | 46 |

The sodium titanium silicate is preferably that produced by the Titanium Alloy Manufacturing Co. under the trade name "Titansil." The cryolite, barium carbonate, zinc oxide and sodium carbonate serve as fluxes as do the sodium and titanium portions of the sodium titanium silicate. The titanium portions also serves as a hardening agent. The silicate and the feldspar, together with the other constituents, form a soda-zinc-lime-silicate glass which differs from the borosilicate and phosphate type glasses of the previous examples but which is equally useful in the present invention.

Example 7

The bonding material of Example 7 illustrates a standard borosilicate type glass which, as has been known, is useable for the bonding of diamond abrasive particles but which is not useable in my invention because it has insufficient flow at the low temperatures of 1600° to 1800° F.

| | |
|---|---|
| Borax glass | 250 |
| Boric acid anhydrite | 250 |
| Silica | 500 |

However, if the frit of this Example 7 be mixed with equal quantities of the frit of Example 1, a bonding material will be formed which is useable according to the present invention, the frit of Example 1 imparting sufficient fluidity to the composite bonding material at the temperature of 1800° F. or less so that the abrasive article is freely formable at that temperature upon the application of pressure thereto. The composition of an abrasive wheel made by using the frits of Examples 1 and 7 is illustrated in Example 8.

Example 8

| | Diamond Section | Core support |
|---|---|---|
| Diamond Powder | 13.00 | |
| Silicon Carbide 120 Mesh | | 75 |
| Silicon Carbide 320 Mesh | 9.7 | 55 |
| Feldspar | 14.2 | 81 |
| Kaolin | 11.36 | 65 |
| Frit of Example 1 | 4.26 | 24.5 |
| Frit of Example 7 | 4.26 | 24.5 |
| Durite #275 Resin | 1.14 | 6 |

The Durite #275 resin is a dry powdered phenol formaldehyde type resin. The other constituents of this and the following examples function as do the constituents of Example 2.

Different proportions of bonding material, abrasive material and filler are disclosed for the central core support of the wheel and for the diamond section thereof, as is well known in the art.

Examples 9 through 13, below, illustrate the wide variation in proportions and constituents of the finished diamond abrasive product which may be used in my invention. In all of these examples, the bonding material of Example 1 is employed but the bonding materials of Examples 3 through 6 could also be employed. In Examples 11 and 12, the feldspar, kaolin and silica are preground together and then mixed with other materials in the usual manner. The compositions of Examples 9 through 13 are given for a 4 inch by ⅛ inch by ⅛ inch grinding wheel.

Example 9

| | Core Support | Diamond Section |
|---|---|---|
| Diamond Powder | | 13.00 |
| Silicon Carbide 320 Mesh | 61 | 10.76 |
| Feldspar | 71 | 12.47 |
| Kaolin | 64 | 11.29 |
| Frit of Example 1 | 68 | 11.88 |
| Silicon Carbide 100 Mesh | 75 | |

Example 10

| | Core Support | Diamond Section |
|---|---|---|
| Diamond Powder | | 13.00 |
| Silicon Carbide 320 Mesh | 61 | 10.76 |
| Feldspar | 76 | 13.37 |
| Kaolin | 68 | 11.88 |
| Frit of Example 1 | 59 | 10.40 |
| Calcium Oxide | 10 | 1.78 |
| Silicon Carbide 100 Mesh | 75 | |

Example 11

| | Core Support | Diamond Section |
|---|---|---|
| Diamond Powder | | 13.0 |
| Silicon Carbide 320 Mesh | 55 | 9.7 |
| Feldspar | 68.1 | 12.0 |
| Kaolin | 58.4 | 10.2 |
| Silica | 19.5 | 3.4 |
| Frit of Example 1 | 49 | 8.52 |
| Durite #275 Resin | 6 | 1.14 |
| Silicon Carbide 120 Mesh | 75 | |

Example 12

| | Core Support | Diamond Section |
|---|---|---|
| Diamond Powder | | 13.00 |
| Silicon Carbide 320 Mesh | 55.0 | 9.70 |
| Feldspar | 107.0 | 18.8 |
| Kaolin | 29.2 | 5.1 |
| Silica | 9.7 | 1.7 |
| Frit of Example 1 | 49.0 | 8.52 |
| Durite #275 Resin | 6.0 | 1.14 |
| Silicon Carbide 120 Mesh | 75.00 | |

Example 13

| | Core Support | Diamond Section |
|---|---|---|
| Diamond Powder | | 13 |
| Silicon Carbide 120 Mesh | 75 | |
| Silicon Carbide 320 Mesh | 55 | 9.7 |
| Nepheline Syenite | 81 | 14.2 |
| Kaolin | 65 | 11.36 |
| Frit of Example 1 | 49 | 8.5 |
| Durite #275 Resin | 6 | 1.14 |

The advantages of the novel method of forming a vitreous bonded diamond abrasive product which I have here disclosed may be summarized as follows: No curing or firing steps whatsoever are necessary. The abrasive article may be produced in a small fraction of the time formerly consumed. The diamond abrasive particles are subjected to relatively low temperatures for only a very short period of time so that no deterioration of said particles takes place. Standard and inexpensive equipment is employed and no inert or non-oxidizing atmosphere need be supplied. Any means of heating is adaptable for use in the method and no special precautions need be taken as to temperature or time control. Finishing operations are held to a minimum. Size of the article is controlled within very close limits. Warpage and swelling of the product produced is eliminated.

The advantages of the vitreous bonded diamond abrasive article are those inherent in the advantages of the method, and in addition the resultant product has an abrasive efficiency equal to or superior to those of comparable prior art products. For example, a 4 inch by ⅛ inch by ⅛ inch wheel the composition of which corresponds to Example 2 gave wear which varied between a non-measureable amount and one-quarter of one-thousandth of an inch when used to grind tungsten carbide continuously for one-half hour. Under similar test conditions comparable commercial wheels exhibited wheel wear between one-quarter of one-thousandth of an inch and two-thousandths of an inch.

It will be apparent that my method and the composition of the diamond abrasive article produced thereby may be varied within limits as defined in the appended claims.

We claim:

1. The method of forming a vitreous bonded diamond abrasive article which comprises mixing the diamond abrasive particles with a bonding material consisting essentially of a glass from the group consisting of borosilicate glass, phosphate glass and soda-lime glass, said glass having the physical property of pouring easily in liquefied state in the range of 1600° to 1800° F., placing the mix in a mold, heating the mix at constant atmospheric pressure until it softens, then applying pressure to the mold to form the article, and removing the formed article from the mold without further curing.

2. The method of forming a vitreous bonded diamond abrasive article which comprises mixing the diamond abrasive particles with a bonding material consisting essentially of a glass from the group consisting of borosilicate glass, phosphate glass and soda-lime glass, said glass having the physical property of pouring easily in liquefied state in the range of 1600° to 1800° F., placing the mix in a mold, heating the mix at constant atmospheric pressure until it softens, then applying a low pressure on the order of 50 to 100 pounds per square inch to the mold to form the article, and removing the formed article from the mold without further curing.

3. The method of forming a vitreous bonded diamond abrasive article which comprises mixing the diamond abrasive particles with a bonding material consisting essentially of a glass from the group consisting of borosilicate glass, phosphate glass and soda-lime glass, said glass having the physical property of pouring easily in liquefied state in the range of 1600° to 1800° F., placing the mix in a mold in at least a semi-dry state, heating the mix at constant atmospheric pressure until it softens, then closing the mold while applying a low pressure on the order of 50 to 100 pounds per square inch to the mold, and removing the formed article from the mold without further curing.

4. The method of forming a vitreous bonded diamond abrasive article which comprises forming a frit of bonding material, said bonding material consisting essentially of a glass from the group consisting of borosilicate glass, phosphate glass and soda-lime glass, said glass having the physical property of pouring easily in liquefied state in the range of 1600° to 1800° F., mixing said frit with the diamond abrasive particles, placing the mix in a mold, heating the mix at constant atmospheric pressure until it softens, then closing the mold while applying a low pressure on the order of 50 to 100 pounds per square inch to the mold, and removing the formed article from the mold without further curing.

5. The method of forming a vitreous bonded diamond abrasive article which comprises mixing the diamond abrasive particles with a bonding material consisting essentially of a glass from the group consisting of borosilicate glass, phosphate glass and soda-lime glass, said glass having the physical property of pouring easily in liquefied state in the range of 1600° to 1800° F., placing the mix in a mold, heating the mix rapidly to from 1600° to 1800° F. or less, and maintaining the mix at said temperature until it softens, then applying a low pressure on the order of 50 to 100 pounds per square inch to the mold, and removing the formed article from the mold without further curing.

6. The method of forming a vitreous bonded diamond abrasive article which comprises mixing the diamond abrasive particles with a bonding material consisting essentially of a glass from the group consisting of borosilicate glass, phosphate glass and soda-lime glass, said glass having the physical property of pouring easily in liquefied state in the range of 1600° to 1800° F., placing the mix in a mold, heating the mix rapidly to from 1600° to 1800° F. or less, and maintaining the mix at said temperature until it softens, then closing the mold while applying a low pressure on the order of 50 to 100 pounds per square inch to the mold, permitting the mold to cool in air at room temperature for from 3 to 5 minutes, and removing the formed article from the mold without further curing.

7. The method of forming a vitreous bonded diamond abrasive article which comprises mixing the diamond abrasive particles with a bonding material consisting essentially of a glass from the group consisting of borosilicate glass, phosphate glass and soda-lime glass, said glass having the physical property of pouring easily in liquefied state in the range of 1600° to 1800° F., including a temporary binder in the mix, placing the mix in a mold, preliminary pressing the mix in the mold to preform it, heating the mix at constant atmospheric pressure until it softens, then closing the mold while applying a low pressure on the order of 50 to 100 pounds per square inch to the mold, and removing the formed article from the mold without further curing.

8. The method of claim 1, in which the bonding material consists essentially of a borosilicate glass containing a melting temperature reducing flux in amount sufficient to render the glass easily pourable in the range of 1600° to 1800° F.

9. The method of claim 1, in which the bonding material consists essentially of a phosphate glass containing a melting temperature reducing flux in amount sufficient to render the glass easily pourable in the range of 1600° to 1800° F.

10. The method of claim 1, in which the bonding material consists essentially of a soda-lime glass containing a melting temperature reducing flux in amount sufficient to render the glass easily pourable in the range of 1600° to 1800° F.

11. The method of claim 4, in which the bonding material consists essentially of a borosilicate glass containing a melting temperature reducing flux in amount sufficient to render the glass easily pourable in the range of 1600° to 1800° F.

12. The method of claim 4, in which the bonding material consists essentially of a phosphate glass containing a melting temperature reducing flux in amount sufficient to render the glass easily pourable in the range of 1600° to 1800° F.

13. The method on claim 4, in which the bonding material consists essentially of a soda-lime glass containing a melting temperature reducing flux in amount sufficient to render the glass easily pourable in the range of 1600° to 1800° F.

14. A vitreous bonded diamond abrasive article comprising diamond abrasive particles and a bonding material therefor consisting essentially of a glass from the group consisting of borosilicate glass, phosphate glass and soda-lime glass, said glass containing a melting temperature reducing flux in amount sufficient to render the glass easily pourable in a liquefied state in the range of 1600° to 1800° F.

15. A vitreous bonded diamond abrasive article comprising diamond abrasive particles and a bonding material therefor consisting essentially of a fritted glass from the group consisting of borosilicate glass, phosphate glass and soda-lime glass, said glass containing a melting temperature reducing flux in amount sufficient to render the glass easily pourable in a liquefied state in the range of 1600° to 1800° F.

16. The diamond abrasive article of claim 14, in which the bonding material consists essentially of a borosilicate glass containing a melting temperature reducing flux in amount sufficient to render the glass easily pourable in the range of 1600° to 1800° F.

17. The diamond abrasive article of claim 14, in which the bonding material consists essentially of a phosphate glass containing a melting temperature reducing flux in amount sufficient to render the glass easily pourable in the range of 1600° to 1800° F.

18. The diamond abrasive article of claim 14, in which the bonding material consists essentially of a soda-lime glass containing a melting temperature reducing flux in amount sufficient to render the glass easily pourable in the range of 1600° to 1800° F.

19. A vitreous bonded diamond abrasive article comprising diamond abrasive particles and a bonding material therefor consisting essentially of feldspar, borax glass, and a melting temperature reducing flux in an amount sufficient to render the bonding material easily pourable in a liquefied state in the range of 1600° to 1800° F.

20. A vitreous bonded diamond abrasive article comprising diamond abrasive particles and a bonding material therefor consisting essentially of a borosilicate glass and a melting temperature reducing flux therefor, said flux being present in proportions on the order of 40% by weight and rendering the bonding material easily pourable in a liquefied state in the range of 1600° to 1800° F.

21. The method of forming a vitreous bonded diamond abrasive article which comprises mixing the diamond abrasive particles with a bonding material consisting essentially of a borosilicate glass and a melting temperature reducing flux therefor, said flux being present in proportions on the order of 40% by weight and rendering the bonding material easily pourable in a liquefied state in the range of 1600° to 1800° F., placing the mix in a mold, heating the mix at constant atmospheric pressure until it softens, then applying pressure to the mold to form the article, and removing the formed article from the mold without further curing.

HARRY WHITTAKER.
PAUL L. KUZMICK.

REFERENCES CITED

The following references are of record in the file of this patent:

UNITED STATES PATENTS

| Number | Name | Date |
|---|---|---|
| 1,996,851 | Benner et al. | Apr. 9, 1935 |
| 2,215,214 | Galey | Sept. 17, 1940 |
| 2,343,218 | Lombard | Feb. 29, 1944 |
| 2,392,568 | Bair | Jan. 8, 1946 |

FOREIGN PATENTS

| Number | Country | Date |
|---|---|---|
| 488,641 | Great Britain | July 5, 1938 |